United States Patent [19]
Johnson

[11] 3,752,245
[45] Aug. 14, 1973

[54] SCALE APPARATUS

[76] Inventor: Berthuld Thomas Johnson, 1551 97th St., North Battleford, Saskatchewan, Canada

[22] Filed: Apr. 17, 1972

[21] Appl. No.: 244,668

[52] U.S. Cl. ............................................. 177/208
[51] Int. Cl. ............................................. G01g 5/04
[58] Field of Search .................. 177/208, 209, 254; 73/141 R

[56] References Cited
UNITED STATES PATENTS
| | | | |
|---|---|---|---|
| 3,150,729 | 9/1964 | Mehki | 177/208 X |
| 1,479,581 | 1/1924 | Berry | 177/208 X |

*Primary Examiner*—George H. Miller, Jr.
*Attorney*—Ralph L. Dugger

[57] ABSTRACT

Scale apparatus that includes a base plate having an upwardly opening shallow generally conical or frusto conical recess, a second plate having a bottom flat surface, a weld seam for attaching the plates in abutting relationship at their adjacent peripheral edges whereby said recess and flat surface form a liquid chamber, a fitting attached to said plates and mounting a pressure gauge to measure the liquid pressure in said chamber, a reserve tank at a higher elevation than said chamber, a line having a pressure relief valve for fluidly connecting the tank to the fitting, a line having a hand operated valve connecting the tank to the fitting, a resilient pad mounted on the second plate and a reinforcing plate mounted on the pad. A ramp may be pivotally mounted on a hemisphere member that in turn is mounted on the reinforcing plate whereby the dual wheels may be driven onto the ramp with one wheel on each side of the hemisphere member.

13 Claims, 5 Drawing Figures

Patented Aug. 14, 1973
3,752,245
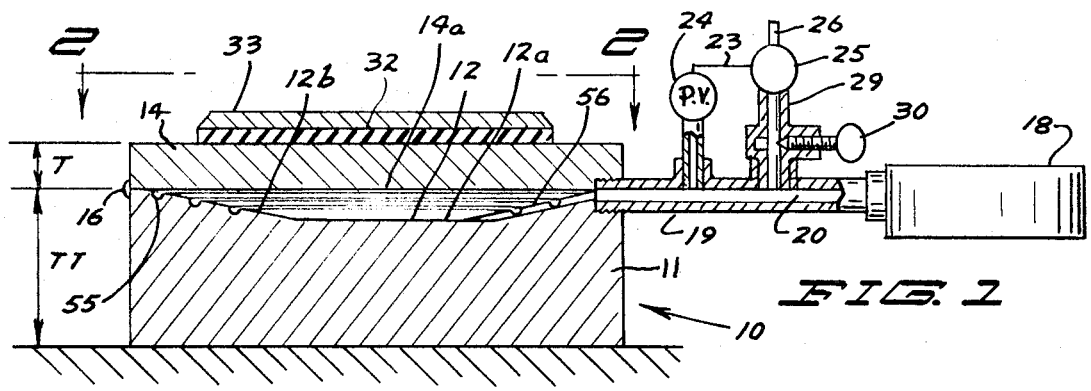
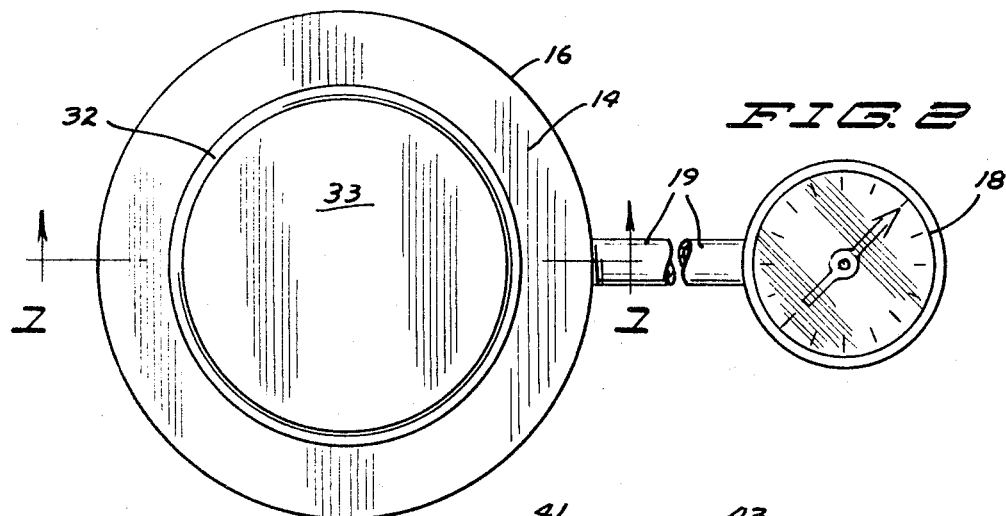
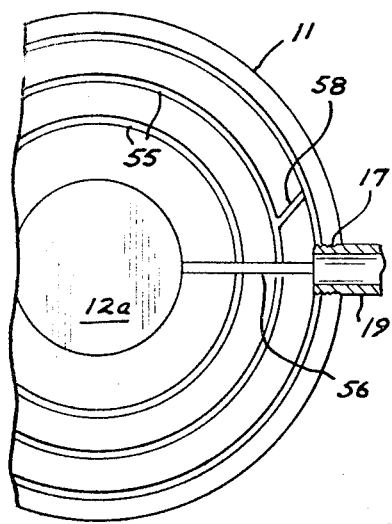
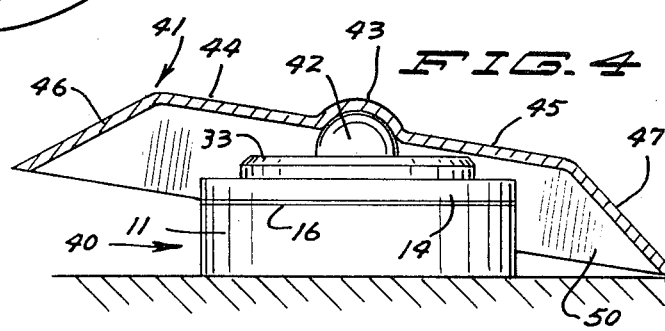
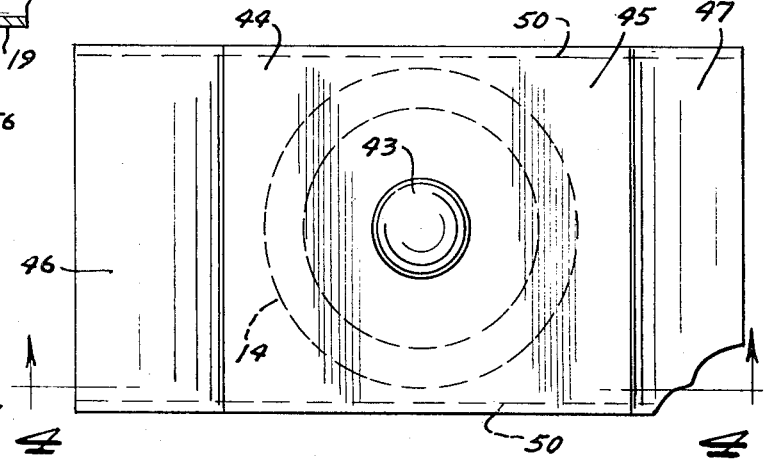

SCALE APPARATUS

BACKGROUND OF THE INVENTION

It is old to provide a platform scale on which the entire truck may be driven for weighing a truck. However such scales are expensive to make, are not readily movable from one location to another, and are heavy. In order to overcome problems such as the above as well as others, this invention has been made.

SUMMARY OF THE INVENTION

Scale apparatus that includes a base plate, a second plate having a peripheral edge abutting against and secured to the upper peripheral edge of the base plate in fluid sealing relationship, said plates having cooperating surfaces forming a liquid chamber and a pressure gauge for measuring the liquid pressure in said chamber.

One of the objects of this invention is to provide a new and novel scale of a relatively small size that through use with an appropriate pressure gauge may be used to weigh loads of a small size of the order of a few pounds, or large loads of the order of many tons. Another object of this invention is to provide a new and novel scale having plates forming a pressure chamber of a shallow generally frusto conical or conical shape to minimize damage to the scale in the event of a heavy load being on the edge thereof or an oil line breaks.

Another object of this invention is to provide a new and novel scale having a load plate and a ramp pivotally mounted thereon to facilitate driving a truck to position the dual wheels on one side of the truck thereon.

BRIEF DESCRIPTION OF THE DRAWINGS

FIG. 1 is a vertical cross-sectional view, generally taken along the line and in the direction of the arows 1—1 of FIG. 2 of part of the first embodiment of the apparatus of this invention, and shows part of the apparatus diagrammatically;

FIG. 2 is a top view of the apparatus of FIG. 1 other than the valves and supply tank are not shown, said view being generally taken along the line and in the direction of the arrows 2—2 of FIG. 1;

FIG. 3 is a fragmentary top view of the base plate of the first embodiment;

FIG. 4 is a vertical cross-sectional view of the second embodiment of the apparatus of this invention, said view being generally taken along the line and in the direction of the arrows 4—4 of FIG. 5; and FIG. 5 is a top view of the apparatus of FIG. 4.

Referring to FIGS. 1–3, the first embodiment of this invention generally designated 10, includes a cylindrical base plate 11 having a radius of curvature much greater than the axial height thereof. The base plate is provided with a shallow generally frusto conical recess 12 in the top surface thereof that has a surface 12a that tapers axially toward the bottom surface of the base plate in a direction radially inwardly from closely adjacent the upper circumferential edge of the base plate and has its minor base 12a more closely adjacent the base plate bottom surface than the top annular edge of the base plate. The height of recess in FIG. 1 is exaggerated for purposes of more clearly illustrating the invention.

A cylindrical top plate 14 of an axial thickness T much less than the axial thickness TT of the base plate and of the same diameter of the base plate has its bottom annular edge portion abutting against the top annular edge of the base plate with the axially adjacent outer circumferential edge portions being joined together by a weld seam 16. The weld seam extends entirely around plates 11, 14 except for the internally threaded fitting inlet 17 formed in adjacent portions of the plates to open to the enclosed chamber 21 formed by the recessed portion of plate 11 and the bottom surface portion of plate 14. In this connection, it is to be noted that the bottom surface 14a of plate 14 is planar and perpendicular to the central axis of plate 11.

A fitting 19 has one end threaded into fitting inlet 17, and an opposite end on which a pressure gauge 18 is threaded, fitting having a fluid passageway 20 opening to chamber 21 and to the interior of the gauge whereby the pressure on the oil in the chamber may be read on the gauge. A line 23 has one end connected to the fitting to open to passageway 20 and an opposite end opening to an oil reserve tank 25 that is at a higher elevation than the fitting. A pressure relief valve 24 is provided in line 23 to permit oil flow from passageway 20 to the tank in the event the pressure in passageway 20 exceeds a preselected value, but constantly blocks fluid flow through line 23 from the tank to the passageway. The tank is provided with a vent cap 26.

A line 29 is connected between the tank 25 and the fitting and has a hand valve 30 therein to permit gravity flow from the tank to passageway 20 when the valve is open and to block fluid through line 29 between the tank and the passageway when the valve is closed.

A circular rubber spacer 32 is mounted on the top surface of the top plate 14 in centered relationship to the top plate, the spacer being of a smaller diameter than the top plate. A circular reinforcing plate 33 is mounted on the spacer with the spacer between plates 14, 33, the diameters of the spacer and the bottom surface portion of the reinforcing plate advantageously being the same.

Although it is not essential to provide either or both of spacer 32 and plate 33, it is advantageous to do so as the spacer serves as a cushion between plates 14, 33 to avoid damage to the major portion of plate 14, particularly when, for example a truck wheel of a truck is moved onto the scale apparatus for weighing the truck. Further with plate 33 being of a somewhat smaller diameter than plate 14, most of the load is transferred to the central portion of plate 14 radially inwardly of its outer circumferential edge, this being particularly desirable when the center of the load is more closely adjacent the outer circumferential edge of plate 14 than the center thereof. As a result, much of the weight of a relatively heavy load is transferred through the oil in the chamber 21 to plate 11 rather than at the outer annular edge portion of plate 14 to plate 11 where it would be transferred to plate 11 in the event plate 33 were not provided.

To permit more rapid movement of oil between chamber 21 and passageway 20, the surface portion 12 advantageously is provided with a plurality of narrow, concentric annular grooves 55, one of which is closely adjacent the outer circumferential edge of surface 12, a radial groove 56 that opens to inlet 17 and extend to the center of recess 12, and a groove 58 that extends between the outer circumferential groove 55 and either one of the inner grooves 55 or groove 56.

In weighing trucks having dual wheels, it is advantageous to use the second embodiment of FIGS. 4 and 5 generally designated 40, that includes all the structure of the first embodiment, a ramp, generally designated 41, and a hemisphere member 42; the fitting being configurated so that the ramp will not abut thereagainst as the wheels move over the legs 46, 47 thereof. Hemisphere member 42 has its flat surface welded to the upper surface of plate 33 to be centrally located relative thereto. The ramp is provided with a hemispherical recessed portion 43 that forms a close fit with the adjacent part of member 42, the circumferential dimension of member 42 being substantially greater than the corresponding inner circumferential dimension of portion 43. The ramp includes a leg 44 extending away from portion 43 in one direction and a second leg 45 extending longitudinally away from portion 43 in the opposite direction. The legs 44, 45 extend in a common plane, the ramps having planar portions joining legs 44, 45 on transverse opposite sides of portion 43. A third leg 46 has one edge joined to the edge of leg 44 remote from hemisphere member 43 and a fourth leg 47 is joined to the edge of leg 45 remote from hemisphere member 42. The legs diverge relative the common plane of legs 44, 45 in directions away from the legs 44, 45 including away from said common plane in a direction opposite the direction that member 43 extends away from said common plane. The legs 46, 47 are of lengths that when recessed portion is on hemisphere member 42, the terminal edge of leg 47 remote from leg 45 abuts against the ground or floor on which the base plate is situated, and the terminal edge of plate 46 remote from plate 44 is vertical above and spaced from the ground or floor. Further, legs 44, 45 are of longitudinal lengths and legs 46, 47 are inclined so that legs 46, 47 will not abut against the plates 33, 14 when one of the terminal edges abut against the ground and portion 43 is on portion 42. Additionally neither of legs 44, 45 will abut against plate 33 or 14 when one of the terminal edges abut against the ground. Trapezoidal plates 50 have edges joined to the opposite transverse edges of legs 44, 45, 46, and 47, one of the plates 50 advantageously having a cutout (not shown) for the fitting to extend through. In use, one of the dual wheels will bear against all or part of legs 44, 45 on one transverse side of portion 43 while the other on the same axle will bear against all or part of legs 44, 45 on the other transverse side of portion 43, and the terminal edges will be spaced from the ground, the truck frame preventing the wheels rolling off the ramp. Legs 46, 47 facilitate the wheels moving up onto and off of lets 44, 45, the ramp pivoting about portion 42 to space the terminal edges of legs 46, 47 from the ground when the dual wheels are on legs 44, 45 respectively. Further portion 42 allows the ramp to pivot about portion 43 to compensate for uneven inflation of the tires. A second unit 10 may be used for the wheels on the opposite side of the truck.

The valve 30 serves as a zeroing device in that it may be opened to permit any air bubbles to move up into tank 25, and oil to move thereabove in the event with no weight on plate 33, the oil in chamber 21 and passageway 20 is under pressure; the gauge 18 advantageously also having a zero adjustment knob (not shown). Additionally, in the event an excessively heavy load is placed on plate 33 so that oil flows through valve 24 to tank 25, valve 30 may be opened to replenish the supply in chamber 21 and passageway 20 after the load has been removed.

Due to the provision of the shallow frusto conical portion 12, the plate 14 has freedom of movement without lever action. The bending of plate 14 through a weight being placed on plate 33 is primarily at the weld seam. The greater the load, the greater the pressure between plates 14, 11 at the outer edges where the plates are welded together, but not much bending is radially inwardly a short distance from said edges. Since the gauge only requires a few drops of oil to activate the gauge for measuring the weight of the load, very little bending takes place.

Further, in the event an oil leak should develop, due to the shallow frusto conical recess, a relatively heavy load on plate 33 may result in plate 14 springing down to be supported by surface portion 12 without plates 11, 14 being permanently being bent out of shape. Also the shallow recess 12 helps keep the oil compartment 21 small to minimize the expansion difference of oil and metal and to minimize air.

With appropriate gauges, the apparatus may be used for weighing very light loads, for example only a few pounds, or very heavy loads, for example many tons, even though the only change made is the substitution of one gauge for another. For heavy loads the oil under high pressure carries the load mainly and the load is determined by the variance in pressure. As to light loads of a few pounds with sensitive gauge to match, it is more the movement of the plates and resultant oil displacement that is measured. For heavy loads, it is important that air in chamber 21 and 20 be at a minimum, but such is not nearly as important for light loads.

Although members 11, 14, 32, 33 are described as being round, it is to be mentioned that they could be rectangular; however it is preferred that they be round to have equal stress around the edge portion of plate 14. Of course if the above members are rectangular, then it is desirable that the shape of the outer peripheral edge of recess 12 be correspondingly changed.

The maximum depth of chamber 21 is less than the axial thickness of plate 14 which in turn is of a thickness that is less than twice that of plate 11.

With reference to recess 12, advantageously the radius of the minor base 12a would be about one-third to two-thirds of the radius of the major base of the recess whereby the central portion of plate 14 would be supported by surface 12a in the event the oil leaked out of chamber 21 and a very heavy load was place on plate 33. It is to be understood that adjacent the juncture of surfaces 12a, 12b, the recess could be rounded so that the recess would be somewhat dished shaped. Further recess 12 could be conical, although a frusto conical shape is more preferred.

As an example of the invention, but not otherwise as a limitation thereon, for a 6 to 8 ton scale, with no weight on the scale, the maximum vertical spacing of any part of surface 12 from the surface 14a is advantageously about 1/16 inch, the height of the base plate is ½ inch to ¾ inch, the top plate is approximately ¼ inch, and the diameters of each of plates 11, 14 is 12 inches. Plates 11, 14 are of mild steel. With this model, the working area is approximately 100 sq. in. and with a 160 lb. gauge, a load of up to about 8 tons can be weighed.

The scale apparatus of this invention can be used for overhead weighing where the base plate is supported above ground elevation and a suitable frame is provided to be supported by plate 33 (or directly by plate 14) and extends downwardly below plate 11 to support the load at an elevation below plate 11. In such a case, advantageously the surface 12b would not extend out to the outer circumferential edges of plate 11, but rather plate 11 would have an annular surface between the surface 12b and the outer circumferential edge of plate 11 that is flat and parallel to surface 14a to provide a level action, the radial dimension of the flat annular surface being many times smaller than the radius of the major base of recess 12. The purpose of providing the flat annular surface is to support the loading effect of the platform and frame, and thereby facilitating the zero adjustment when no load is on the platform.

What is claimed is:

1. Scale apparatus comprising a metal base plate, a second metal plate, each of said plates having peripheral edges, first means for securing said plates together at their peripheral edges, said plates having cooperating surface portions to form a liquid chamber, a gauge, and a fitting connected to at least one of said plates to open to said chamber to place the gauge in fluid communication with said chamber, the second plate surface portion being flat and the base plate surface portion having a shallow recess that has a surface portion that is tapered away from the second plate in a direction away from the base plate peripheral edge, and said base plate surface portion having a groove extending from the fitting toward the central part of the base plate surface portion.

2. Scale apparatus comprising a base plate having a peripheral edge and a recessed upper surface portion, a second plate having a peripheral edge secured to the base plate in fluid sealing relationship to form a liquid chamber between the second plate and the recessed surface portion, a gauge, means for connecting the gauge to at least one of the plates to measure the pressure in the liquid chamber, said recessed portion having a tapered surface portion that is tapered away from the second plate in a direction away from the base plate peripheral edge and is relatively shallow, and a resilient pad mounted on the second plate on the side thereof opposite the base plate and a reinforcing plate mounted on the pad opposite the second pad.

3. The apparatus of claim 2 further characterized in that said plates are cylindrical and are of steel, and that said recess is of a generally frusto conical shape having its major base more closely adjacent the second plate than its minor base.

4. Scale apparatus comprising a base plate having a peripheral edge and a recessed upper surface portion, a second plate having a peripheral edge secured to the base plate in fluid sealing relationship to form a liquid chamber between the second plate and the recessed surface portion, said recessed portion having a tapered surface portion that is tapered away from the second plate in a direction away from the base plate peripheral edge and is relatively shallow, a gauge, and means for connecting the gauge to at least one of the plates to measure the pressure in the liquid chamber, said means comprises a fitting having a fluid passageway, a liquid oil reserve tank at a higher elevation than said chamber, a first line connected between said fitting and the tank to fluidly connect the passageway to the interior of the tank, and a pressure relief valve in said line to constantly block fluid flow from the tank to the passageway and permit fluid flow from the passageway to the tank when the pressure in the passageway exceeds a preselected value.

5. The apparatus of claim 4 further characterized in that there is provided a second line connected between said fitting and tank, to fluidly connect the passageway to the interior of the tank and that a hand operated valve is provided in the second line for selectively blocking fluid flow through the second line between the passageway and the tank.

6. Scale apparatus comprising a base plate having a peripheral edge and a recessed upper surface portion, a second plate having a peripheral edge secured to the base plate in fluid sealing relationship to form a liquid chamber between the second plate and the recessed surface portion, said recessed portion having a tapered surface portion that is tapered away from the second plate in a direction away from the base plate peripheral edge and is relatively shallow, a gauge, means for connecting the gauge to at least one of the plates to measure the pressure in the liquid chamber, pivot means mounted on the second plate and a ramp pivotally mounted on the pivot means.

7. The apparatus of claim 6 further characterized in that the pivot means includes a hemispherical member, and that the ramp includes a hemispherical portion to pivot on said hemispherical member and inclined legs on opposite sides of said hemispherical portion.

8. Scale apparatus comprising a metal base plate, a second metal plate, each of said plates having peripheral edges, first means for securing said plates together at their peripheral edges, said plates having cooperating surface portions to form a liquid chamber, a gauge, a fitting connected to at least one of said plates to open to said chamber to place the gauge in fluid communication with said chamber, a liquid reserve tank at a higher elevation than the chamber, pressure relief valve means for permitting fluid flow from the passageway to the tank, a line for fluidly connecting the tank to the fitting passageway and hand operated valve means for controlling fluid flow through said line.

9. The apparatus of claim 8 further characterized in that there is provided a ramp and means for mounting the ramp on the second plate for pivotal movement between a position solely supporting the ramp and a position to permit a wheel being moved thereonto.

10. The apparatus of claim 8 further characterized in that said first means comprises a weld seam, that each of the base plate and second plate are generally cylindrical and that the base plate surface portion is of a shallow generally frusto conical shape, is centered relative the cylindrical surface of the base plate and has its major base more closely adjacent the second plate than its minor base.

11. Scale apparatus comprising a metal base plate, a second metal plate, each of said plates having peripheral edges, first means for securing said plates together at their peripheral edges, said plates having cooperating surface portions to form a liquid chamber, a gauge, and a fitting connected to at least one of said plates to open to said chamber to place the gauge in fluid communication with said chamber, one of said surface portions having a groove extending from the fitting toward the central part of the gase plate surface portion for conducting liquid in the chamber of the fitting.

12. The apparatus of claim 11 further characterized in that pivot means is mounted on the second plate and that a ramp is pivotally mounted on the first means.

13. The apparatus of claim 11 further characterized in that said first means comprises a wild seam and that the depth of the chamber increases in a direction away from the wild seam.

* * * * *